April 3, 1956 S. J. GARTNER 2,740,301
INDEXING MECHANISM
Filed June 21, 1952 2 Sheets-Sheet 1

INVENTOR
STANLEY J. GARTNER
BY
ATTORNEY

April 3, 1956 S. J. GARTNER 2,740,301
INDEXING MECHANISM
Filed June 21, 1952 2 Sheets-Sheet 2

INVENTOR
STANLEY J. GARTNER
BY
ATTORNEY

United States Patent Office 2,740,301
Patented Apr. 3, 1956

2,740,301

INDEXING MECHANISM

Stanley J. Gartner, Emporium, Pa., assignor to Sylvania Electric Products Inc., a corporation of Massachusetts Application June 21, 1952, Serial No. 294,902

10 Claims. (Cl. 74—394)

This application relates to conveyors and to intermittent driving mechanisms suitable for advancing conveyors stepwise.

Conveyors of the type which carry a workpiece stepwise from one station to other stations successively and which are arrested with workpieces at the several stations, frequently require a drive mechanism that will advance during a time interval that is shorter than the at-rest time interval. In this way, the relatively simple operation of advancing a conveyor can be effected in a minimum period consistent with power requirements and inertia loads; and at the same time the mechanisms at the various work stations can be operated during a relatively longer time interval as may be required by relatively more complex mechanical operations. Furthermore, the time division may be arbitrary rather than some simple fraction of the whole period. It is accordingly an object of this invention to provide a novel mechanism effective for converting rotary motion at a first or drive shaft to intermittent indexing mechanism at a second or driven shaft in such fashion as to divide the drive cycle into motion and rest intervals, and more particularly to provide for indexing drive during an arbitrary time interval, especially less than half of the period of rotation of the continuous drive shaft.

The driven load, especially a conveyor having substantial inertia and momentum, is accelerated, transported, and decelerated during its intermittent advance according to schedules that are not dependent on the inherent properties of mechanisms commonly used for intermittent indexing drive. An object of the present invention is to provide a novel drive, facilitating arbitrary schedules of acceleration, drive and deceleration as may be found desirable.

Where a chain conveyor is intermittently advanced by a sprocket the links of the chain are gradually wrapped around the sprocket. This inherently produces a more or less jerky travel unless the irregularities caused by the wrapping of the links around the drive sprocket are in some way accommodated. This requires a type of drive in which the rate of sprocket drive can be made arbitrarily variable during the drive intervals, and accordingly a further object of the invention is to provide a drive mechanism combined with a chain conveyor of such character that the driving rate can be varied in accordance with the desired time rates of acceleration, deceleration, and a sprocket-to-link drive irregularity.

The foregoing objects and additional objects and features of novelty will be apparent from the following detailed disclosure of an illustrative embodiment of the invention. This embodiment will be seen to employ a main drive shaft carrying a planetary gear which, during at-rest intervals of the driven shaft, rolls around a gear on the driven shaft. During the drive intervals a crank fixed to the planetary gear controls rotation of the planetary gear and of the driven gear. The crank is confined by a cam slot, during drive intervals, whose shape can arbitrarily be formed to suit requirements of acceleration, deceleration, and sustained drive in any predetermined or arbitrary schedule; and periods of rest are also provided for. Thus, at the start of the drive the crank may follow an epicyclic path (or the equivalent thereof) and at this time no drive is transmitted to the driven shaft. Thereafter, the crank may be forced to depart progressively from the epicyclic path and produce acceleration of the driven gear on the intermittent shaft with which the planetary gear meshes. Thereafter, the crank may be forced toward the center of the drive shaft or away from the center of the drive shaft in dependence upon the desired speed of rotation of the driven shaft in relation to the drive shaft. Within limits, the arcuate extent of the cam track can be varied for a given ratio of the planetary gear to the driven gear; and by changing the gear ratio this extent can be varied further. The arcuate extent of the effective cam track determines the position of the period of rotation of the drive shaft during which the driven shaft is caused to index. In the illustrative embodiment detailed below the drive shaft carries the planetary gear idly for 191° while it produces active drive during 169°; and during this intermittent drive for advancing a conveyor, any schedule of acceleration, sustained drive and deceleration can be effected as desired. During the 169° advance of the continuous drive shaft the intermittent drive shaft in this illustration advances 180°.

As will be seen a mechanism is provided for locking the driven shaft against accidental shift during the at-rest time intervals that is effective for locating the driven conveyor at predetermined positions and for insuring entry of the crank on the planetary gear into the cam track after travelling freely in the space provided in the 191° sweep of the planetary gear.

An illustrative embodiment is shown in the accompanying drawings, wherein.

Figure 1:
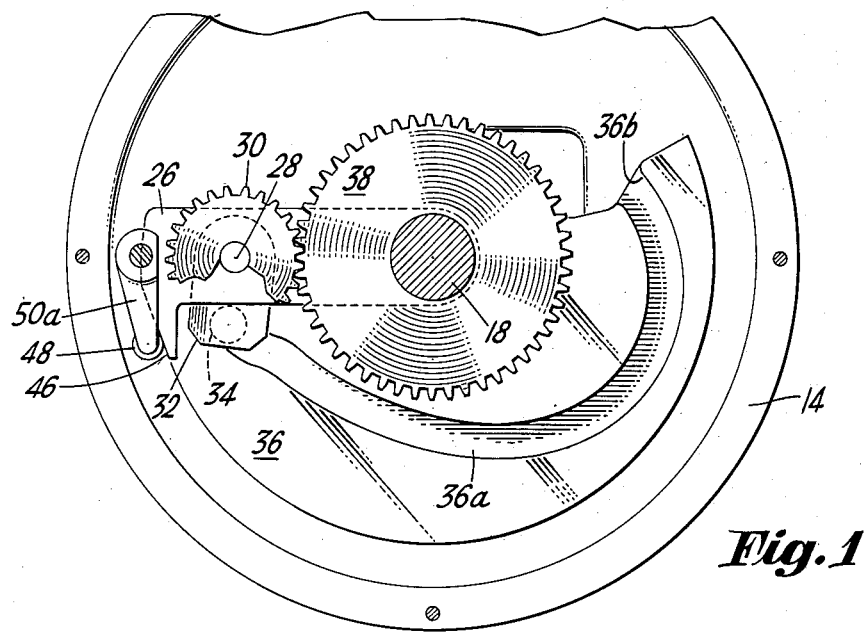
Fig. 1 is a fragmentary cross section along the line 1—1 in Fig. 2.
Figure 2:
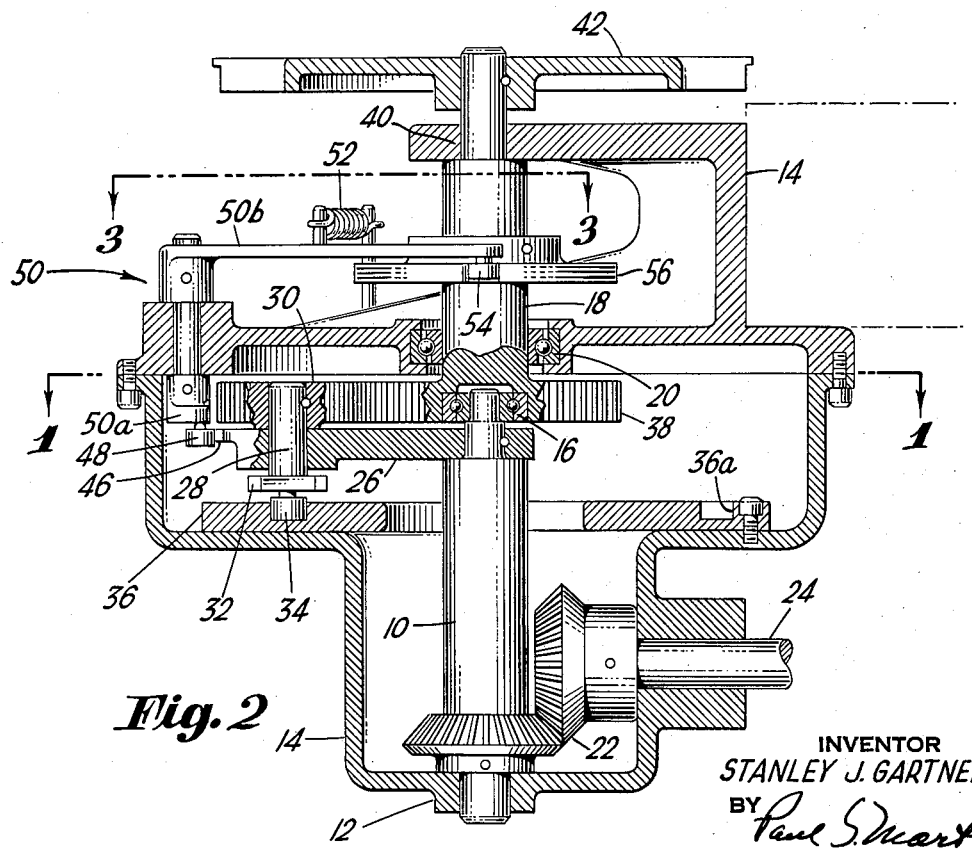
Fig. 2 is a vertical cross section of the mechanism in Fig. 1.

Referring first to Figures 1 and 2, it is seen that a main drive shaft 10 is supported in a lower bearing 12 in frame structure 14 and at its upper end is supported in a bearing 16 formed in a second shaft 18 that in turn has a bearing 20 in the frame structure. Shaft 10 rotates continuously by virtue of a pair of pinions 22 that connect drive shaft 10 with shaft 24 coupled to a continuously and uniformly rotating electric motor, with appropriate gear reduction, not shown.

An arm 26 is fixed to shaft 10 and shaft 28 carried in a bearing at the end of arm 26 is secured at one end to pinion or planetary gear 30 and at its opposite end to a crank 32 having a cam follower 34. Extending only part way around shaft 10 (see Fig. 1) is a stationary, constrained cam 36 having a cam track 36a in which pin or cam follower 34 is confined at certain time intervals. Cam 36 is fixed to frame 14.

Planetary gear 30 is in mesh with a "sun gear" 38 that is intermittently driven as will be explained when pin 34 is confined by cam track 36a.

Figure 4:
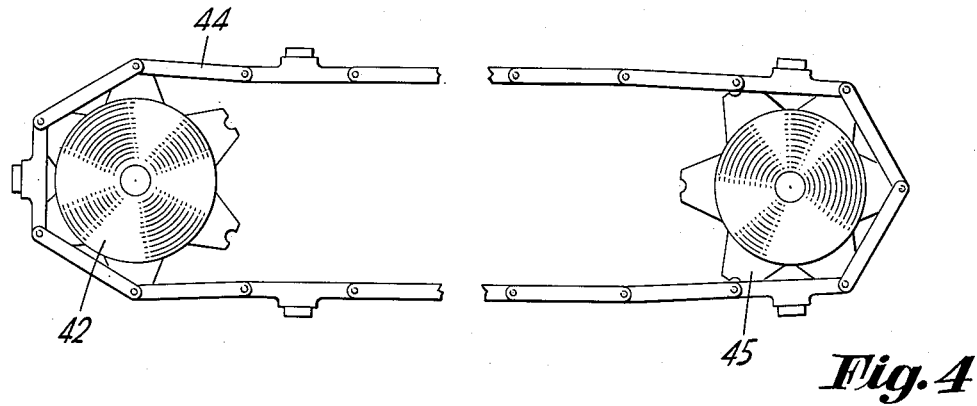
Fig. 4 is a plan view, in reduced scale, showing the relationship between a conveyor and the sprocket of Fig. 2.

Driven gear 38 is fixed to or integral with shaft 18 that has a fixed bearing 40 in the frame in addition to bearing 20 described. At is upper end shaft 18 carries sprocket 42 which, as shown in Fig. 4, carries a chain 44 whose long links are picked up, advanced, and wrapped around the sprocket during drive intervals, three links being advanced during each half-rotation of this sprocket. An idler sprocket 45, biased by a spring, not shown, to tension chain 44, defines the path of the chain links.

Figure 3:
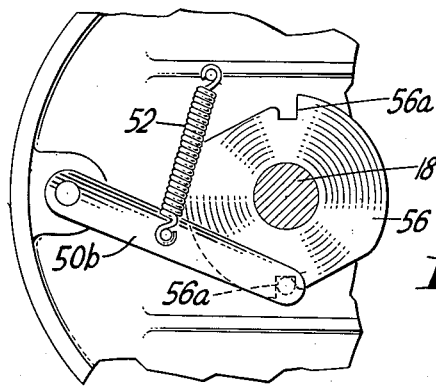
Fig. 3 is a fragmentary cross section along the line 3—3 of Fig. 2.

Arm 26 carries a cam 46 that engages cam follower 48 on arm 50a of bell crank 50, and arm 50b of the bell crank, biased by spring 52 so that cam follower 48 presses against cam 46, also carries a locking detent 54 into a notch (Figs. 2 and 3) 56a in locking plate 56 fixed to shaft 18. Two notches, 56a, are provided so that shaft 18 may be arrested after every 180° of advance.

In operation, shaft 24 drives shaft 10 uniformly and continuously, thereby carrying arm 26 and planetary gear 30 in uniform travel about shaft 10. Shafts 18 and 10 being coaxial, and gear 38 being mounted on shaft 18, gear 30 rolls around gear 38 whenever cam follower or pin 34 is free of cam slot 36a, and gear 30 also rolls freely about gear 38 when pin 34 travels along a natural epicyclic portion of the cam track. When pin 34 is confined by the cam slot so as to rotate crank 32 about its axis at a rate other than the natural rate with gear 38 locked, that gear is driven uniformly, or it is accelerated, or it is retarded in dependence on the cam contour.

Figure 5:
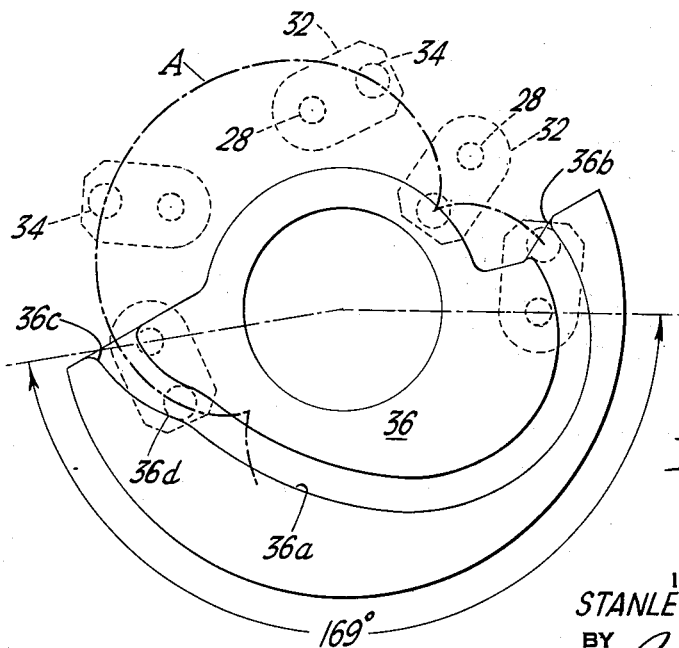
Fig. 5 is a diagrammatic illustration explaining the operation of the mechanism in Fig. 1.

From the time that pin 34 leaves cam slot 36a, as at 36b in Fig. 1, until pin 34 reenters the cam slot as shown, it is important although not vital that gear 38 be locked. When gear 38 is arrested pin 34 is constrained to follow an epicyclic path; and the cam is designed so that the starting and finishing positions of cam follower 34 conform to the epicyclic free path produced by the planetary gear and its "sun gear." This epicyclic path is illustrated by the broken line A in Fig. 5, and the various positions of crank 32 that carries pin or cam follower 34 are also shown. Pin 34 commences its epicyclic travel as it leaves cam portion 36b and the position of the opening 36c of the cam track is disposed appropriately to receive pin 34 at the end of its epicyclic sweep along path A. Shaft 10 rotates through 191° and carries pinion 30 on arm 26 during the free epicyclic sweep. This free sweep extends not only between portions 36b and 36c of cam track 36a but extends also during part of the time that pin 34 travels along a portion of cam slot 36a, that is to say, along the portion between points 36c and 36d of the cam slot which is shaped for continued epicyclic travel of pin 34.

Beyond point 36d (counterclockwise in Fig. 5) the cam slot departs from the epicyclic path and gradually arrests the rotation of planetary gear 30 which in turn gradually accelerates gear 38 to advance the sprocket and conveyor 42, 44. The first portion of the cam track produces acceleration to start the conveyor travelling. The rates of acceleration and drive thereafter are determined by the cam contour. In arcuate portions of the cam track where pin 34 follows a circular path about the drive shaft axis, driven gear 38 travels at the same arcuate rate as the drive shaft. The contour of the cam is appropriately formed with irregularities to take into account the changing load represented by the conveyor as the successive long links (Figure 4) are picked up by sprocket 42 and wrapped around that sprocket. Between the end positions 36d and 36b which are 169° apart, the cam track must change the radial position of the pin 34 appropriately to conform to the end points of epicyclic path A. During the epicyclic travel of crank 32, gear 38 is fixed to insure such epicycle by locking mechanism 50, 52, 54 and 56; and at the end of the epicyclic travel, gear 38 is unlocked by cam 46 and cam follower 48.

It is seen that gears 30 and 38 have a two-to-one ratio and that crank 32 is at 79° relative to arm 26 at the start of cam-constrained drive and at 101° at the end of this cam constrained drive. For effective constraint by cam track 36a these two angles should not be either too small or too large, and for the two-to-one gear ratio illustrated the 169° drive arc should not be greatly reduced. However, if much less than this drive arc is desired a different gear ratio can be used.

The illustrative embodiment incorporates advances and features of novelty which are naturally susceptible to a latitude of varied application as will be apparent to those skilled in the art and it is accordingly appropriate that the appended claims should be broadly construed, consistent with the spirit and scope of the invention.

What I claim is:

1. An intermittent drive mechanism including, in combination, a drive shaft, a driven shaft coaxial therewith, a driven gear carried by said driven shaft for rotation therewith, a planetary gear in mesh with said driven gear, an arm rigid with and extending from said drive shaft, said arm supporting said planetary gear, a crank, constituting a cam follower, united to said planetary gear, and a stationary cam controlling the motion of said cam follower, said driven shaft having a locking mechanism insuring the uniform repetitive travel of said cam follower.

2. An intermittent drive mechanism in accordance with claim 1 wherein said locking mechanism includes a spring effective to bias said locking mechanism into locking position, a cam follower operatively connected to said locking mechanism, and a cam on said supporting arm movable into operative engagement with said locking mechanism releasing cam for releasing said driven shaft.

3. An intermittent drive mechanism including in combination a drive shaft, a driven shaft coaxial therewith, a driven gear carried by said driven shaft for rotation therewith, a planetary gear in mesh with said driven gear, an arm rigidly extending radially from said drive shaft and supporting said planetary gear a crank constituting a cam follower united to said planetary gear, and a stationary cam receiving said cam follower, said cam having constrained portions contoured to provide an arbitrary schedule of acceleration, sustained travel and deceleration of said driven shaft, and providing a relief for free epicyclic travel of said crank affording a period of rest for said driven shaft.

4. An intermittent drive mechanism including, in combination, a drive shaft, a driven shaft for rotation therewith, a driven gear carried by said driven shaft for rotation therewith, a planetary gear in mesh with said driven gear, an arm rigid with and extending from said drive shaft and supporting said planetary gear, a crank constituting a cam follower united to said planetary gear, a stationary cam controlling said cam follower, said cam having constrained portions contoured to provide an arbitrary schedule of acceleration, sustained travel, and deceleration of said driven shaft, and providing a relief for free epicyclic travel of said cam follower, thereby affording a period of rest for said driven shaft, and a locking mechanism arresting said driven shaft during the epicyclic travel of said crank.

5. An intermittent drive mechanism in accordance with claim 4 in which there is further provided a release mechanism for said locking mechanism, operated by said arm upon entry of the crank into the constrained portion of the cam.

6. An intermittent drive mechanism including in combination a drive shaft, a driven shaft coaxial therewith, a driven gear carried by said driven shaft for rotation therewith, a planetary gear in mesh with said driven gear, an arm extending rigidly from said drive shaft and supporting said planetary gear, a crank constituting a cam follower united to said planetary gear, and a stationary cam receiving said cam follower along a portion of the path of said cam follower and said cam being relieved to afford free travel of the cam follower along a further portion of said path.

7. An intermittent drive mechanism including in combination a drive shaft, a driven shaft coaxial therewith, a driven gear carried by said driven shaft for rotation therewith, a planetary gear in mesh with said driven gear, an arm extending rigidly from said drive shaft and supporting said planetary gear, a crank constituting a cam follower united to said planetary gear, and a stationary cam receiving said cam follower along a portion of the path of said cam follower, said cam having a cam follower actuating portion and having a contoured portion constraining the cam follower into an epicyclic path, and said cam being relieved to afford free travel of the cam follower along a further portion of said path.

8. An intermittent drive mechanism including in combination a drive shaft, a driven shaft coaxial therewith, a driven gear carried by said driven shaft for rotation therewith, a planetary gear in mesh with said driven gear, an arm extending rigidly from said drive shaft and supporting said planetary gear, a crank constituting a cam follower united to said planetary gear, and a stationary cam receiving said cam follower along a portion of the path of said cam follower, the cam having a portion constraining the cam follower to drive the driven gear, a further portion of the cam constraining travel of said cam follower in the path required when said gear is arrested, and said cam being relieved to afford free travel of the cam follower.

9. An intermittent drive mechanism including in combination a drive shaft, a driven shaft coaxial therewith, a driven gear carried by said driven shaft for rotation therewith, a planetary gear in mesh with said driven gear, an arm rigidly extending from said drive shaft and supporting said planetary gear, said planetary gear having a crank constituting a cam follower, and a stationary cam receiving said cam follower, said cam having a cam follower actuating portion and having a contoured portion constraining the cam follower into an epicyclic path during a predetermined portion of the rotation of said planetary gear carrying arm, said driven shaft having a locking mechanism insuring the uniform repetitious travel of the said cam follower from the point at which it commences epicyclic travel to the point at which it ends said epicylic travel.

10. An intermittent drive mechanism including in combination a drive shaft, a driven shaft coaxial therewith, a driven gear carried by said driven shaft for rotation therewith, a planetary gear in mesh with said driven gear, an arm rigidly extending from said drive shaft and supporting said planetary gear, said planetary gear having a crank constituting a cam follower, and a stationary cam receiving said cam follower, said cam having a cam follower actuating portion and having a contoured portion constraining the cam follower into an epicyclic path during a predetermined portion of the rotation of said planetary gear carrying arm, said driven shaft having a locking mechanism insuring the uniform repetitious travel of the said cam follower from the point at which it commences epicyclic travel to the point at which it ends said epicyclic travel, said locking mechanism including a spring effective to bias said locking mechanism into locking position, a cam follower operatively connected to said locking mechanism, and a cam on said supporting arm movable into operative engagement with said locking mechanism releasing cam for releasing said driven shaft.

References Cited in the file of this patent

UNITED STATES PATENTS

| | | |
|---|---|---|
| 377,133 | Arnold | Jan. 31, 1888 |
| 1,178,923 | Johns | Apr. 11, 1916 |
| 1,624,835 | Hatcher | Apr. 12, 1927 |
| 2,547,453 | Egy | Apr. 3, 1951 |
| 2,655,817 | Armelin | Oct. 20, 1953 |